United States Patent Office 3,654,075
Patented Apr. 4, 1972

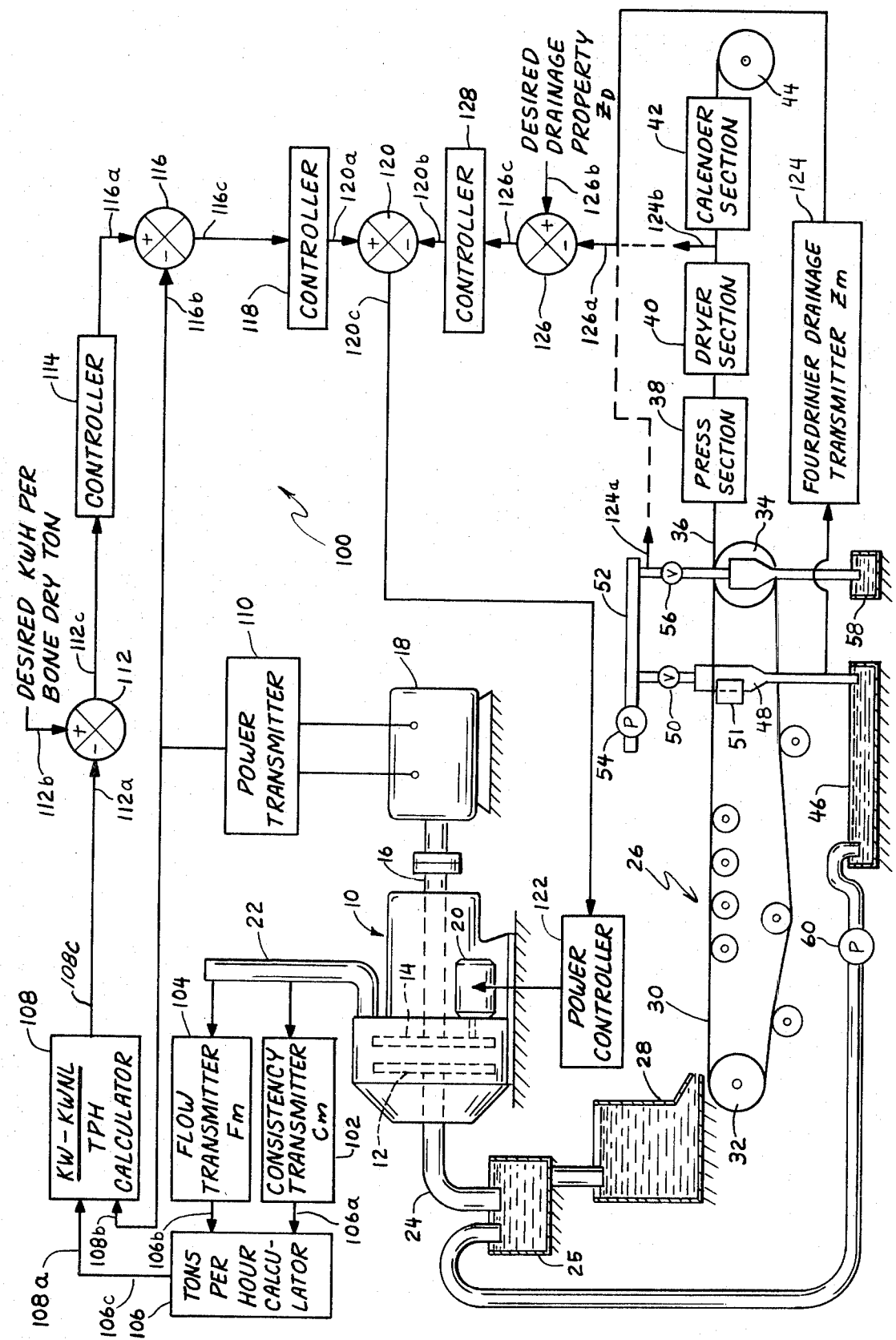

3,654,075
CONTROL SYSTEM FOR PAPER REFINERS UTILIZING MASS RATE AND MACHINE PROPERTY COMPENSATION
Marion A. Keyes IV, South Beloit, Ill., and John A. Gudaz, Beloit, Wis., assignors to Beloit Corporation, Beloit, Wis.
Filed Dec. 10, 1969, Ser. No. 883,759
Int. Cl. B02c 7/14
U.S. Cl. 162—254    4 Claims

ABSTRACT OF THE DISCLOSURE

A refiner is controlled by the measurement of the refiner motor load. A feedforward loop employs data derived from both flow and consistency of the stock passing through the refiner to provide a set point for a power control loop which influences the energization of the control motor for the positioning of the axially movable beater element with respect to the stationary beater element. The flow and consistency of the stock are combined in a first calculator to provide a mass per unit time flow signal. This signal is combined in a second calculator with an actual power consumed by the refiner drive motor signal and a no-load power consumed value to provide an enregy per unit mass signal which is compared with a desired energy per unit mass to provide control for the control motor. In addition to the feedback control derived from the power control loop, an additional control loop provides further feedback action in accordance with a selected property of the paper machine itself, such as a particular characteristic of the sheet.

BACKGROUND OF THE INVENTION

(1) Field of the invention

This invention relates generally to refiners for processing fluid paper stock, and pertains more particularly to a control system utilizing mass rate and machine property data in the control of the motor that positions the axially movable beater element with respect to the stationary beater element of the refiner.

(2) Description of the prior art

Historically, refiners have been controlled by measuring the difference in temperature ($\Delta T$) between the incoming and outgoing stock of the refiner for the purpose of positioning the movable beater element of the refiner with respect to the stationary element in accordance with the temperature rise. One such control system that has met with a high degree of success is illustrated in United States Patent No. 3,309,301, issued Mar. 14, 1967 to Richard F. McMahon et al. for Material Working Apparatus, which patent is owned by the present assignee. Whereas the control system described and claimed in said McMahon et al patent has functioned exceptionally well, compensation for flow changes and consistency changes were not provided for. Also, there was no sensing of the power requirements for the refiner as determined by the power consumed by the electric drive motor. Still further, the alluded to patent makes no compensation for certain properties of the paper making machine itself, these properties including drainage characteristics of the Fourdrinier, compensated couch vacuum, sheet porosity, sheet formation and/or sheet density.

SUMMARY OF THE INVENTION

Accordingly, one object of the present invention is to provide a control system that automatically takes into consideration flow, consistency, power and paper machine operational data. More specifically, an aim of the invention is to compute a signal indicative of flow and consistency characteristics of the incoming raw stock and use the signal as a set point signal for a power control loop to thereby control the power or load requirements of the refiner. Additionally, where there is a deviation from a desired sheet or intermediate property, compensation is made therefor in order to reduce the degree of maladjustment that would otherwise occur. In other words, where there is a change that appears in a selected property of the paper machine itself, the corrective action that would otherwise progress in the wrong direction at the refiner is corrected for so that the power requirements of the refiner are kept within tolerable limits.

BRIEF DESCRIPTION OF THE DRAWING

The single figure selected for illustrating the invention depicts a typical refiner and paper machine, mostly in diagrammatic form, and a control system for the refiner, mostly in block form.

DESCRIPTION OF THE PREFERRED EMBODIMENT

In order to appreciate the benefits to be derived from a practicing of the invention, it is deemed desirable to outline as briefly as possible the apparatus with which the control system is to be employed. Accordingly, it will be discerned from the drawing that a refiner has been depicted which has been generally denoted by the reference number 10. In the form illustrated, the refiner 10 is of the so-called disc variety and includes a stationary beater disc or refining element 12 and a rotary beater disc or refining element 14. Of course, the invention is readily susceptible to use with a conical plug type refiner, such a refiner generally being known as a Jordan refiner, in which a rotatable conical plug is moved axially with respect to a complemental shell in which it is housed.

The refiner 10 as set forth in the drawing has a drive shaft 16 connected with the rotary element 14 and through the agency of an electric drive motor 18 the shaft 16 is rotated so as to produce the requisite rotation of the beater element 14. As already explained, the present invention is regarded as an improvement over the aforesaid McMahon et al. patent and reference may be made to this patent for further explanatory material with respect to the construction of the refiner 10. It should be pointed out, though, that a pneumatic motor is referred to in the McMahon et al. patent as the means for positioning the movable beater element with respect to the stationary one; in the instant situation, it is intended that an electric motor 20 will be used for this purpose. Such motor may function as described in United States Patent No. 1,933,-814, issued on Nov. 7, 1933 to Darcy E. Lewellen et al. for Stock Consistency Control. Even though the said Lewellen et al. patent is not of recent issue, it is quite pertinent because it deals with a Jordan refiner and very briefly shows a motor for rotating a threaded shaft that is employed for positioning the conical plug with respect to the shell that houses this plug.

It will be recognized that the fluid stock enters the refiner 10 through an inlet conduit 22 and is discharged through an oulet conduit 24 into a stuff box 25. The stuff box 25, as is conventional, retains the heavy fiber stock which has been refined and then forwards the stock to the paper making machine, this machine being designated in its entirety by the reference numeral 26. Although the valving between the stuff box 25 and the headbox 28 of the machine 26 has not been depicted, nonetheless it will be appreciated that the refined stock from the headbox 28 is delivered through a slice onto the Fourdrinier section 30 of the machine 26. It might be helpful to include in the description of the machine 26 reference to the presence of a breast roll 32 and a couch roll 34, the Fourdrinier wire being entrained or passing about these two rolls 32, 34 as is well known.

Proceeding with the general description of the paper making machine 26, it will be noted that the wet sheet of paper, labeled 36, formed on the Fourdrinier section 30 continues to a process section 38 where a considerable amount of water is removed and then through a dryer section 40 where still more water is removed. The dried paper sheet 36 is then directed to a calender section 42 and from the section 42 the finished paper sheet is wound on a reel labeled 44.

Inasmuch as it is intended that a portion of the control system deal with either sheet properties and/or intermediate variables on the paper machine, it is desirable to describe further the machine 26. Accordingly, it will be perceived that a whitewater or wire pit 46 appears beneath the Fourdrinier section 30. As can be seen in U.S. Pat. No. 3,005,490, granted on Oct. 24, 1961 to Edgar J. Justus for Paper Machine Suction Box Control, also assigned to the present assignee, the wire pit 46 can be supplied with drainage from the Fourdrinier section 30 via number of drop legs 48, only one such leg 48 appearing in the drawing accompanying this application. The drop leg 48 has a vacuum valve 50 which affords independent control of the suction box 51 associated with the leg 48. The suction valve 50 is connected to a vacuum manifold 52 which in turn is connected to a pump 54 for producing the requisite vacuum. As is evident from the disclosure of the said Justus patent, there are other drop legs serviced by the manifold 52. Also connected to the manifold 52 is a valve 56 that is in fluid circuit with the couch roll 34. The drainage from the couch roll 34 is collected in still another pit which has been indicated by the reference numeral 58. The whitewater collected in the pit 46, as well as that collected in the pit 58, is returned to the stuff box 26 in the present instance by means of a pump 60.

Having presented the foregoing general description of the paper making apparatus with which the present invention can be utilized, it is thought that an understanding of how the control system functions will be more readily understood. Therefore, describing now the control system indicated generally by the reference numeral 100, the system 100 includes a consistency transmitter 102 that receives operational information from the conduit 22 through which the stock entering the refiner 10 flows. The consistency could be measured as the stock is discharged from the refiner 10 via the conduit 20, a suitable correction factor then being introduced for the purpose of compensating for any consistency change occasioned by the refining action that has occurred. Also included in the control system is a flow transmitter 104 that provides a signal that is representative of the flow through the conduit 22 and hence through the refiner 10.

From the information derived from the transmitters 102 and 104, a calculation is performed in what will be termed a tons per hour calculator 106 having a pair of input lines 106a and 106b. The calculator 106 receives the information transduced and forwarded by the transmitters 102, 104 and provides an output signal via its output line 106c that is representative of the mass stock rate, more specifically tons per hour. It will be appreciated that an appropriate constant can be introduced into the multiplication performed by the tons per hour calculator 106 so as to provide an output signal over the line 106c that is truly representative of tons of stock per hour or any other units that might be desired such as perhaps pounds per hour.

At any rate, the signal forwarded via the output line 106c is delivered via an input line 108a belonging to what will be termed a KW-KWNL/TPH calculator labeled 108. The calculator 108 has a second input line 108b and an output line 108c. Inasmuch as a power transmitter 110 is connected to the drive motor 18, being of the wattmeter type, a signal is furnished from the transmitter 110 that is indicative of the power consumed by the drive motor 18 in rotating the refining element 14 in the fiber slurry constituting the fluid stock. The control motor 20, which positions the refining element 14 with respect to the element 12 can be backed off sufficiently so as to provide a no load power signal which is introduced via the line 108b into the calculator 108 where it is stored so that it can be subsequently subtracted from the actual power signal delivered by the power transmitter 110 when the refiner 10 is in the process of refining the fluid stock.

What the calculator 108 does is to provide internally a difference between the actual kilowatts and the no load kilowatts, and since the signal fed into the calculator by way of the input line 108a is representative of the tons per hour of stock flow as indicated above, then the ratio or output signal from this calculator will be representative of the energy required to refine each ton. Since this is a variable and differs from a desired value, resort is made to a summing junction or comparator circuit 112 having an input terminal 112a via which the ratio signal from the output line 108c of the calculator 108 is introduced into the comparator. A second input terminal 112b introduces the set point signal which is representative of the desired energy/bone dry ton, more specifically, desired KWH/bone dry ton. Any difference between the incoming signals delivered via the terminals 112a, 112b appears as an error signal at the output terminal 112c of the comparator 112. A controller 114 processes the signal and then delivers it to a second summing junction or comparator circuit 116, doing so via its input terminal 116a.

Actually, the signal delivered to the input terminal 116a constitutes a set point for a power control loop now to be described. The comparator 116 has a second input terminal 116b which is connected to the power transmitter 110 so that any difference between the incoming power loop set point signal and the actual power as determined by the power transmitter 110 is reflected in the valve of a difference or error signal appearing at the output terminal 116c of the comparator 116. The output signal from the terminal 116c is forwarded to a controller 118 that processes the signal so that it is delivered to still another summing junction or comparator circuit 120, this comparator 120 having an input terminal 120a and another input terminal 120b which carries a signal presently to be referred to. The output terminal, which is labeled 120c, of the comparator 120 is connected to a power controller 122 which serves to provide the proper degree of energization of the control motor 20. Thus, the power controller 112 furnishes an appropriate control signal to the motor 20 which determines the axial position of the beater element 14.

Recapitulating for a moment, the transmitters 102 and 104, which are contained in a feedforward loop, provide a suitable signal that quite promptly causes a change in the position of the beater element 14 when there is either a change in the consistency of the stock or the rate of flow thereof. This will in turn reflect in the power consumed by the drive motor 18. Since the power consumed is either increased or decreased under these circumstances, the transmitter 110 will forward a signal that is representative of such change and it is utilized in the calculator 108 to provide a different ratio signal which is compared with the desired energy/bone dry ton set point signal impressed on the comparator 112 with the consequence that the set point signal for the power control loop is revised by way of a different set point signal being presented to the comparator 116 through the agency of the input terminal 116a. Here again, the power control loop will continually make changes via the output terminal 116c which reflect changes in both the mass rate of flow and the power being consumed by the drive motor 18.

With the portion of the system 100 that has been described above in mind, it is felt that the role played by the feedback loop portion of the system 100 now to be described will be easily understood. Basically, it is planned that an intermediate property or a sheet property be utilized in upgrading the action of the system that involves the feedforward and feedback loops already referred to. Since different paper making machines 26, and different grades of paper, will require a careful selection of the specific property to be utilized in the upgrading process, only one property will be described in detail. Since the wet end of the machine reflects changes more rapidly than the dry end of the machine, the drainage on the Fourdrinier section 30 will be utilized to make any necessary changes in the position of the axially movable refining element 14 with respect to the stationary element 12. Accordingly, a transmitter 124 senses the flow through the drop leg 48 as it flows downwardly into the wire pit 46. This transmitter 124 forwards a signal indicative of the flow to a summing junction or comparator circuit 126 by way of an input terminal 126a, the comparator 126 having a second input terminal 126b and an output terminal 126c. It is the second input terminal 126b that has applied thereto a set point signal representative of the desired sheet or intermediate property which can be generally denoted as $Z_D$ whereas the measured data can be indicated as $Z_M$. Of course, where the drainage from the Fourdrinier section 30 is utilized, the Z designation becomes specific and the set point signal applied to the input terminal 126b will be on the basis of the desired drainage that is to be considered in upgrading or changing the control performed by the feedforward and feedback loops that have already been described. The interaction is supplied by the output or difference signal, that is any error existing between the signals impressed on the input terminals 126a, 126b. This output or error signal from the comparator 126 which appears on the terminal 126c is delivered to a controller 128 that is connected as far as its output side is concerned to the input terminal 120b of the comparator 120.

Thus, it will be seen that any difference or error between the signals arriving via the input terminals 120a and 120b of the comparator 120 will be forwarded as an error signal via the terminal 120c to the power controller 122 which will reposition the movable element 14 so that an appropriate spacing will exist between it and the stationary element 12 so as to fulfill the requirements dictated by the several set point signals that have been referred to.

As already explained, for the sake of illustration, the drainage of the Fourdrinier section 30 has been utilized in modifying the control action performed by the feedforward and feedback loops that involve power corrections. Actually, the leg 48 represents only part of the drainage into the pit 46 and other legs can be utilized as well or they can be collectively connected so that a signal that is indicative of the total drainage utilized. Actually, the flow through the pump 60 may be used and the transmitter 124 reconnected so as to provide a signal representative of the total drainage flow. Still further, it has been mentioned that the correction can be based on compensated couch vacuum and in this regard, a take off or sensing point 124a can be used with an appropriate transmitter connected at this location. Where a sheet property, such as porosity, formation or density is to be utilized, an appropriate determination can be made at the location labeled 134b. These locations 124a and 124b are indicated by arrows and dotted lines so as to denote where transmitters would be placed so as to forward the proper signal, depending on the particular machine property that is selected, to the input terminal 126a of the comparator 126. Consequently, whatever signal is impressed on the input terminal 126a will be employed and appropriately compared with the desired set point signal entering at 126b so that the output or error signal forwarded via the terminal 126c will be utilized as far as comparing with the signal delivered into the comparator 120 via the input terminal 120a.

We claim:
1. In combination with a paper making machine and a refiner for processing fluid paper stock which includes a pair of relatively rotatable and axially movable refining elements, a drive motor for relatively rotating said elements and a control motor for axially shifting one of the said elements with respect to the other, a control system comprising first means providing a signal that varies in accordance with the consistency of the stock flowing through said refiner, second means providing a signal representative of the rate of flow of stock through said refiner, third means connected to said first and second means for providing a signal representative of the mass stock rate, fourth means for providing a signal representative of the power utilized by said refiner, fifth means connected to said third and fourth means for calculating and providing a signal corresponding to the ratio of the value of said power signal less the value of a signal corresponding to a no load power condition with respect to the mass stock rate signal provided by said third means which is representative of the energy per unit mass, sixth means for comparing said ratio signal with a set point signal representative of the desired energy per unit mass to produce a first error signal indicative of any difference therebetween, seventh means connected to said fourth and sixth means for comparing said power signal with said first error signal to provide a second error signal representative of any difference therebetween, eighth means providing a signal representative of a given property of the paper machine, ninth means for comparing said property signal with said second error signal to provide a third error signal representative of any difference therebetween, and tenth means for controlling said control motor in accordance with the value of said third error signal.

2. The combination set forth in claim 1 in which said paper machine includes a Fourdrinier section and said property signal is representative of the drainage from said Fourdrinier section.

3. In combination with a paper making machine and a refiner for processing fluid paper stock which includes a pair of relatively rotatable and axially movable refining elements, a drive motor for relatively rotating said elements and control motor for axially shifting one of said elements with respect to the other, a control system comprising a power control loop responsive to the actual power consumed by said drive motor for operating said control motor in accordance with any difference between a signal representative of the actual power consumed by said drive motor and a power set point signal, a power per unit mass control loop responsive to rate of flow and consistency signals derived from the fluid stock passing through said refiner to provide a calculated energy per unit mass signal which is compared with a set point signal indicative of a desired energy per unit mass so as to provide said power set point signal in accordance with any difference therebetween, said power per unit mass control loop including calculating means for multiplying the consistency and flow signals together to provide a mass per unit time signal and additional calculating means for providing a ratio of said power signal less the value of a no load power signal with said mass per unit time signal to provide said energy per unit mass signal, and a feedback loop for additionally controlling said control motor in accordance with a given property of the paper making machine.

4. The combination set forth in claim 3 in which said power control loop includes a power transmitter for providing a signal representative of the power consumed by said drive motor, and in which said power per unit mass control loop includes a consistency transmitter, a flow transmitter, a comparator for providing a first error signal representative of the difference between said ratio signal with a set point signal, which represents the desired energy per unit mass, said power control loop including a comparator for comparing said first error signal with said power signal to provide a second error signal representative of any difference therebetween, said property loop including a transmitter for providing a signal representative of the given property, a comparator for comparing said property signal with a set point signal representative of the desired value of said property to produce a third error signal the system further including a comparator for comparing said second and third error signals with each other to provide an fourth error signal representive of any difference therebetween, said fourth error signal controlling said control motor.

References Cited

UNITED STATES PATENTS

| | | | |
|---|---|---|---|
| 2,666,368 | 1/1954 | Staege et al. | 162—254 |
| 2,699,095 | 1/1955 | Irwin | 241—36 |
| 2,854,894 | 10/1958 | Kline et al. | 241—37 |
| 3,309,031 | 3/1967 | McMahon et al. | 241—37 |

OTHER REFERENCES

Betts: "Automation in the Paper Industry," The Paper Maker, January 1969, pp. 50, 52, 54, 55.

S. LEON BASHORE, Primary Examiner

A. D'ANDREA, JR., Assistant Examiner

U.S. Cl. X.R.

162—198, 263; 241—36, 37

UNITED STATES PATENT OFFICE
CERTIFICATE OF CORRECTION

Patent No. 3,654,075         Dated April 4, 1972

Inventor(s) Marion A. Keyes IV, et al.

It is certified that error appears in the above-identified patent and that said Letters Patent are hereby corrected as shown below:

Column 1, line 54, "3,309,301" should be --3,309,031--. Column 3, line 37, after "via" insert --any--; line 63, "20" should be --24--. Column 4, line 54, "valve" should be --value--; line 65, "112" should be --122--. Column 6, line 2, "134b" should be --124b--.

Signed and sealed this 1st day of August 1972.

(SEAL)
Attest:

EDWARD M. FLETCHER, JR.         ROBERT GOTTSCHALK
Attesting Officer               Commissioner of Patents